United States Patent

Bernal et al.

[11] Patent Number: 5,291,911
[45] Date of Patent: Mar. 8, 1994

[54] CONICAL VARIABLE AREA THROTTLING DEVICE

[75] Inventors: Alvaro Bernal, Houston; Jackie R. Boyles, Sugar Land, both of Tex.

[73] Assignee: Texaco Inc., White Plains, N.Y.

[21] Appl. No.: 92,964

[22] Filed: Jul. 19, 1993

[51] Int. Cl.⁵ .................................................. F16K 11/14
[52] U.S. Cl. ........................................ 137/1; 137/865; 137/876
[58] Field of Search ............... 137/599, 601, 1, 561 A, 137/865, 876; 251/212

[56] References Cited

U.S. PATENT DOCUMENTS

| | | | |
|---|---|---|---|
| 2,837,115 | 6/1958 | Bancroft | 137/865 X |
| 4,505,297 | 3/1985 | Leech et al. | 137/516 A |
| 4,528,919 | 7/1985 | Harbolt et al. | 137/561 A X |
| 4,574,827 | 3/1986 | Konak | 137/599 X |
| 4,662,391 | 5/1987 | Tolley | 137/561 A X |
| 4,681,129 | 7/1987 | Juzi et al. | 137/561 A X |
| 4,712,581 | 12/1987 | Emmenthal et al. | 137/561 A |
| 4,800,921 | 1/1989 | Greebe | 137/561 A |
| 4,953,635 | 9/1990 | Stowe | 137/561 A X |

FOREIGN PATENT DOCUMENTS 674783 11/1963 Canada .................................. 137/601

*Primary Examiner*—Stephen M. Hepperle
*Attorney, Agent, or Firm*—James L. Bailey; Kenneth R. Priem; Russell J. Egan

[57] ABSTRACT

The subject device has a pair of conical segment members extending downstream from a central chamber and provided with means to relatively rotate them to proportion the flow of the non-predominant (volumetric-wise) phase of two-phase fluid therethrough. Relative positioning of the conical segment members forces the two-phase mixture streams to change velocities and mix the liquid phase with the gaseous phase prior to their encountering a flow-splitting device such as a tee junction.

8 Claims, 4 Drawing Sheets

CONICAL VARIABLE AREA THROTTLING DEVICE

BACKGROUND OF THE INVENTION

1. The Field of the Invention

The present invention relates to a method and apparatus to be located upstream of any flow-splitting device for proportioning the mass rates of the non-predominant (volumetric-wise) component in a two phase mixture flowing in a pipe.

2. The Prior Art

The present invention will be discussed with reference to a preferred use in the field of petroleum production and, in particular, to steam distribution networks for steam injection during enhanced oil recovery operations. During such operations the proportion of the gas phase mass of the steam to the total mass of the steam, commonly known as the steam quality, needs to be controlled throughout the steam distribution network at the surface in order to minimize the phenomenon known as "phase splitting" which occurs at substantially all nodes in a pipe network where the two-phase fluid flow is split into two or more branches and the gas phase mass extraction ratios of the branches are not necessarily equal.

This phase splitting problem causes the quality of the steam (i.e. the ratio of the gas phase mass to total mass of the steam) to be other than that desired and/or required at each final destination or injection point. This, in turn, causes the total heat input at the final destination subsurface strata to be out of specification or tolerance resulting in an inefficient or poor steam sweep of the layer. Unless there is a perfectly symmetrical gas phase mass rate distribution (equal gas or predominant phase extraction ratios) at each and every junction in the steam distribution system and a very specific geometry of the piping system, each flow-splitting device in the system (usually a T-junction) will cause the phase-splitting problem to become more severe by increasing the difference in the liquid mass (or non-predominant phase) extraction ratios as the steam passes through each successive junction. Since it is not always practical to have the same gas phase mass extraction rates at every node of a network, it becomes highly desirable to have a device to fix or minimize this phase-splitting problem, at least at those junctions where it will have the most significant effect.

Currently there are several alternative approaches to correcting or minimizing the above discussed problem, including the use of the following described devices. There are a number of different configurations of static mixers each of which is used to homogenize a two-phase fluid flow and covert it into a mist just upstream of the flow-splitting device (for example a T-junction) by dispersing the liquid phase within the gas phase. Examples of these devices can be found in U.S. Pat. Nos. 3,599,943; 3,785,620; and 4,062,524.

A carburetor type of approach has also been proposed. This type of device has a chamber to trap the liquid phase upstream of the phase-splitting device (again a T-junction) and one or more tubes connecting liquid chamber to either immediately before the junction (via a single tube) or to the exit of each branch thereof (via two tubes). The passage of the gaseous phase over the end of the respective tubes will create suction drawing the liquid phase from the liquid chamber into junction device or the branch ends thereof in proportion to the vapor mass rate flowing in each branch leg of the junction. These types of devices are shown in U.S. Pat. No. 5,218,985, for the single tube embodiment, and U.S. patent application Ser. No. 07/961,977 filed Oct. 16, 1992, for the dual tube embodiment.

There are also a number of devices having a member which either fixedly or adjustably extends into a flow stream to provide a variable cross section area within the pipe. This member generally acts on the fluid flow just upstream of the flow-splitting device by one of two different methods. In one method the perimeter of the pipe is affected by means of a movable internal partition to thereby control the steam quality at two separated outlets, essentially based on wet perimeter considerations. In the other method the cross sectional area of the pipe is affected by means of at least one plate mounted within the pipe facing generally perpendicular to the flow stream and located upstream of a fixed internal partition that isolates the two outlets of the junction. The steam quality at the two outlets is control by rotating the plate to adjust effective cross-sectional area of the pipe upstream of the two outlets. Examples of these devices can be found in U.S. Pat. Nos. 2,114,653; 3,080,884; 4,269,211; 4,354,528; 4,824,614; and 5,165,450.

SUMMARY OF THE INVENTION

The present invention is intended for use upstream of a flow-splitting point in a pipe carrying a gas/liquid or a gas/solid two-phase fluid flow. The main objective of this invention is to proportion the mass rate of the non-predominant (volumetric-wise) phase substantially immediately prior to a downstream flow-splitting point. The present invention obtains this mass rate proportioning effect by relatively rotating two members each of which has a sector of a conical surface that pseudo-blocks the cross sectional area upstream of the conical sectors. The pseudo-blocking action forces both two-phase mixture streams to change their velocities at the two openings and, at the same time, conveys the liquid (or solid) phase into two different pressure gradient environments caused by the difference in velocity. These adjustable different pressure gradient environments enhance the selectivity for the path of the liquid (or solid) phase particles based on the particle size and the relative vacuum to which it is exposed. The net effect of this pseudo-blocking action is a combined throttling action, with a reduced pressure drop, and selective enlargement of the wet perimeter just upstream of the flow-splitting point.

BRIEF DESCRIPTION OF THE DRAWINGS

The present invention will now be described, by way of example, with reference to the accompanying drawings in which.

DETAILED DESCRIPTION OF THE PREFERRED EMBODIMENT

Figure 1:
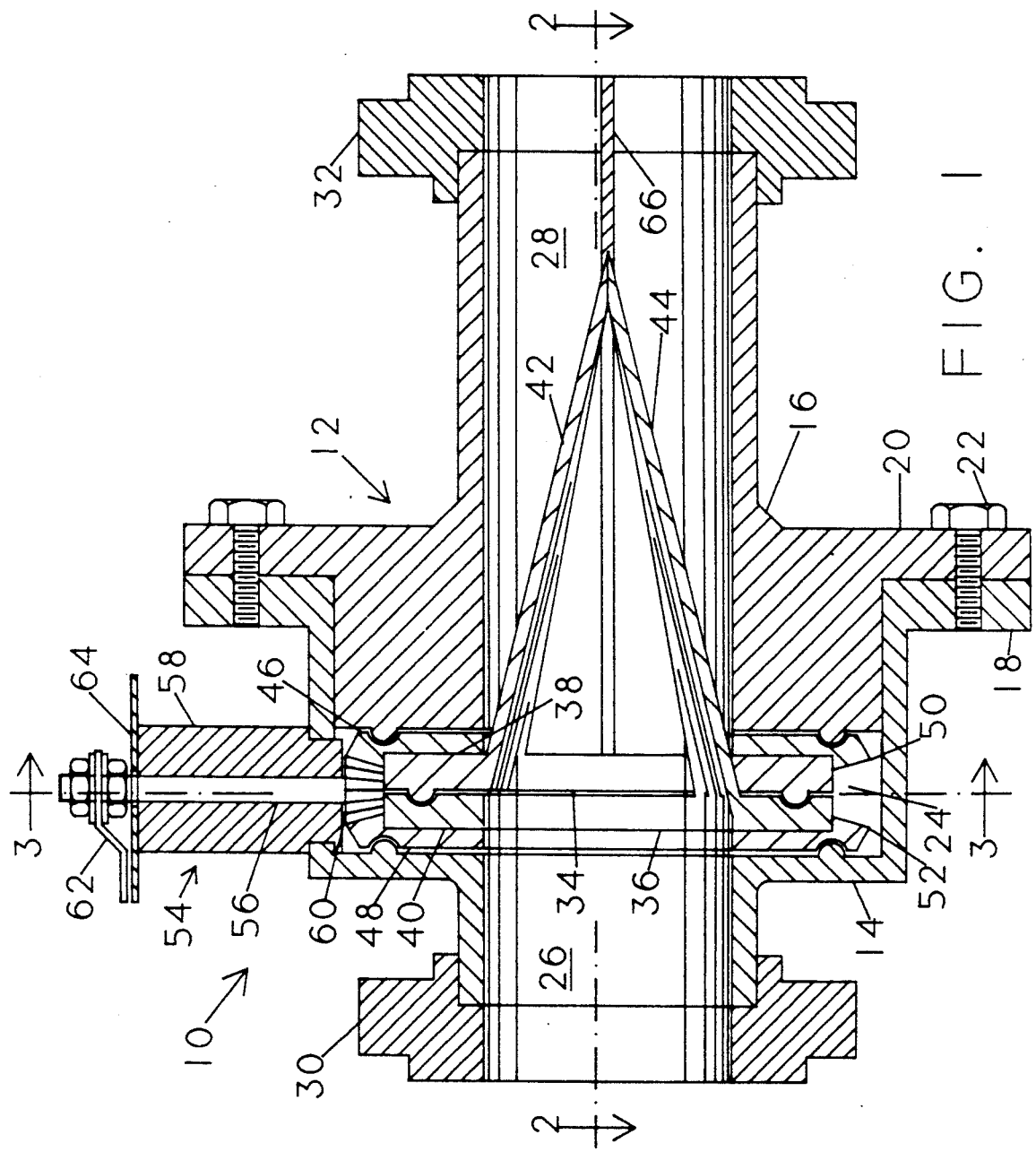
FIG. 1 is a vertical longitudinal section, taken along line 1—1 of FIG. 2, showing the conical variable area throttling device according to the present invention.
Figure 2:
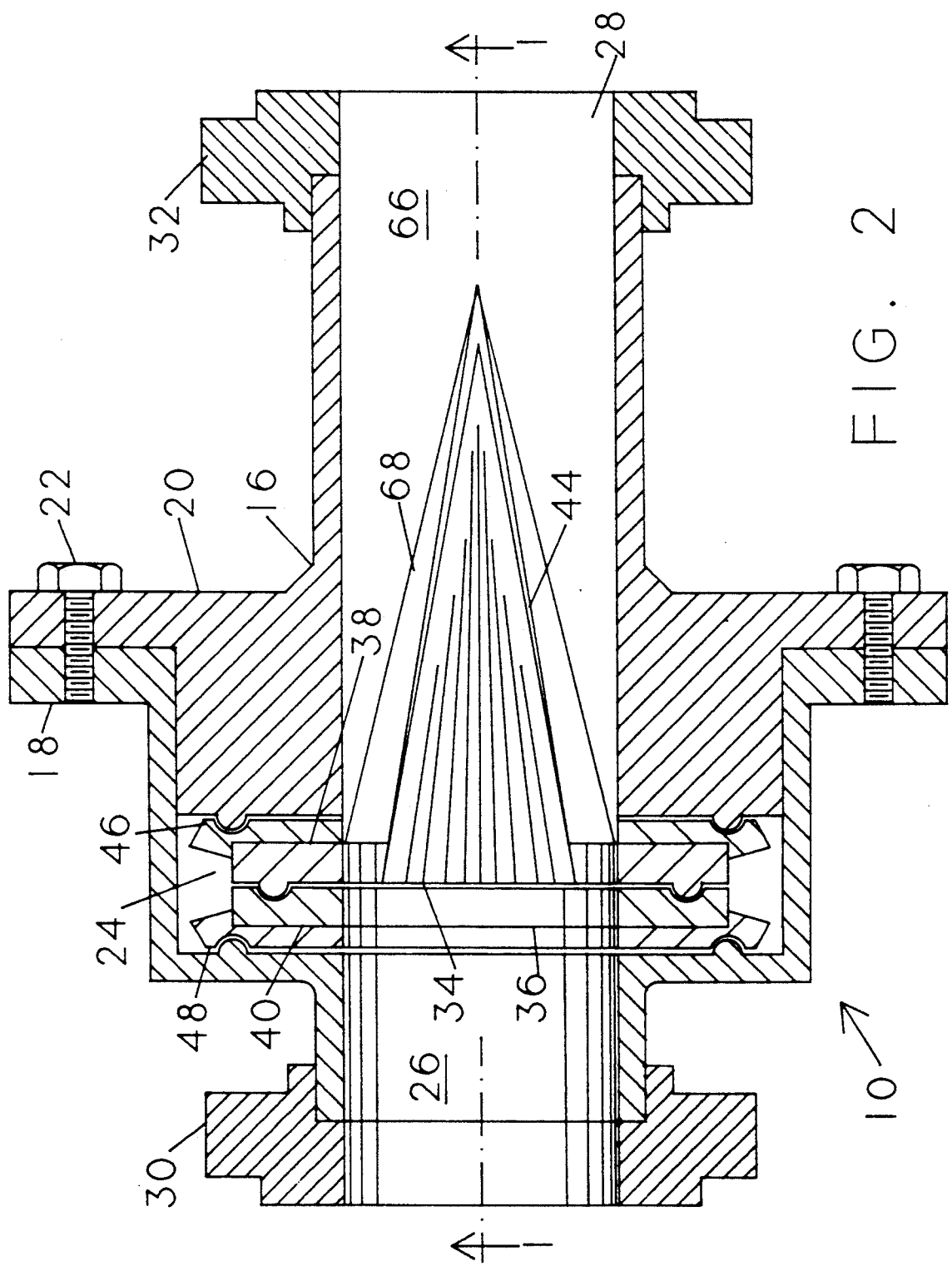
FIG. 2 is a horizontal longitudinal section, taken along line 2—2 of FIG. 1, showing the conical variable area throttling device according to the present invention.
Figure 3:
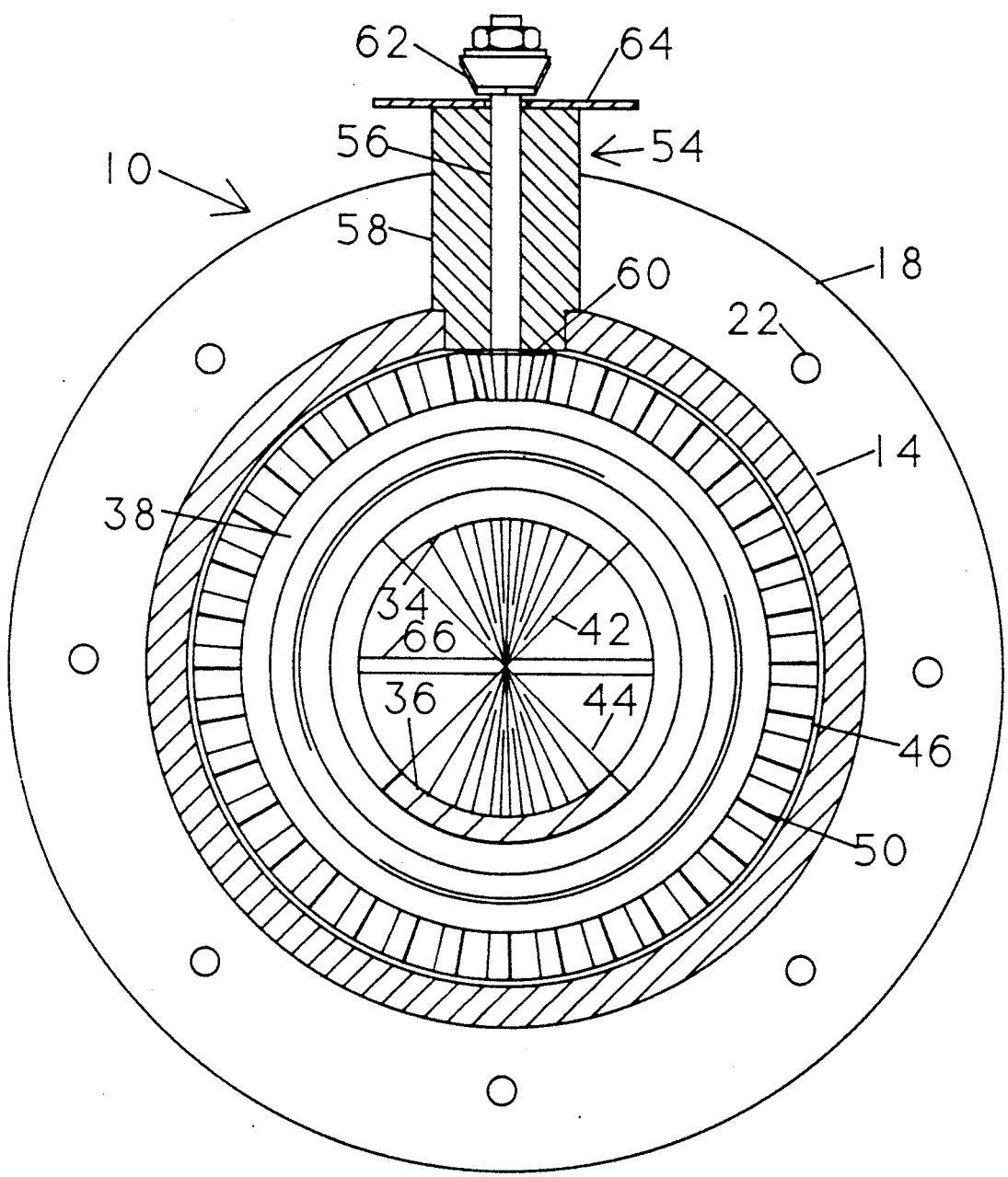
FIG. 3 is a transverse section taken along line 3—3 of FIG. 1 showing the present invention in a first set condition.
Figure 4:
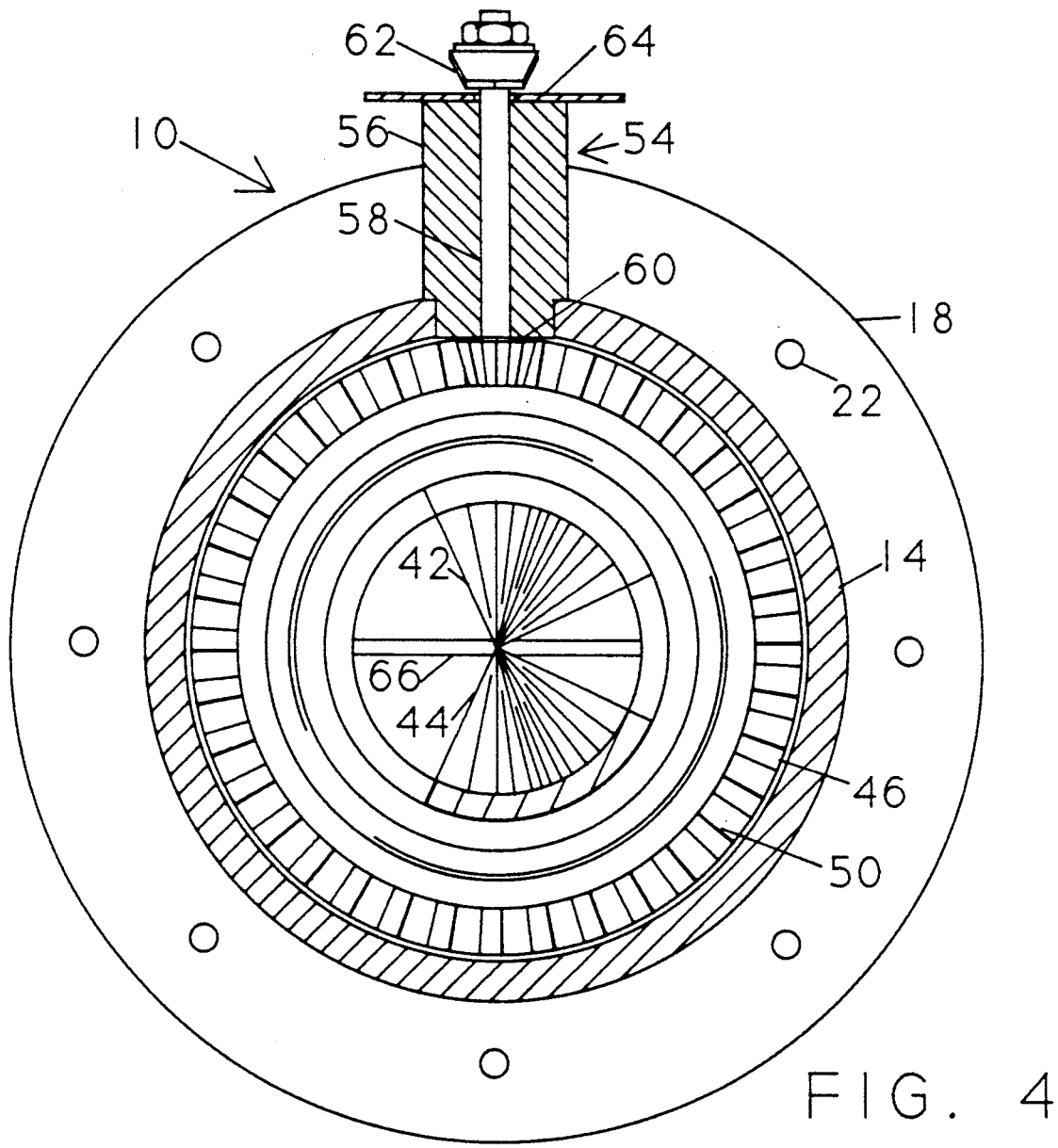
FIG. 4 is a view similar to FIG. 3 showing the subject device in a second set condition.

Turning now to FIG. 1, the subject device 10 is shown in longitudinal vertical section and includes a housing 12 having a generally cylindrical first housing member 14 and a second generally cylindrical housing member 16 with respective flanges 18 and 20 by which the housing members are secured together by a plurality of bolts 22. The housing members 14, 16 define a chamber 24 therebetween as well as a pair of aligned cylindrical inlet and outlet passages 26, 28 extending upstream and downstream, respectively, from the chamber 24. Annular inlet and outlet coupling members 30, 32, respectively, are fixed on opposite ends of the housing 12 for assembling the present invention between an upstream pipe (not shown) and a downstream flow-splitting device (also not shown). First and second proportioning members 34, 36 are rotatably mounted within the housing. Each proportioning member 34, 36 has a radially directed flange segment 38, 40 in overlying arrangement within the chamber 24, and an integral conical segment 42, 44 extending from the chamber 24 into the downstream outlet passage 28. Each conical segment subtends an angle of not more than 90° (see FIGS. 3 and 4) and extends into the passage at an angle of approximately 15° (plus or minus 10°). An annular bevel gear member 46, 48, of larger outer diameter than the flange segments, is fixedly mounted on the respective flange segment 38, 40. The annular bevel gear members 46, 48 are provided with opposing or inwardly directed teeth 50, 52 adjacent their outer diameters. A gear housing assembly 54 is mounted on and extends radially outwardly from one edge of the housing 14. This assembly includes a shaft 56 extending axially through the gear housing 58 with a bevel gear 60 on the inner end of the shaft lying between the annular bevel gear members. Thus rotation of the bevel gear 60 will cause corresponding opposite relative rotation of the first and second flow proportioning members 34, 36. A pointer assembly 62 is mounted on the opposite outer end of the shaft. A dial 64 is fixed to the outer end of the gear housing 58. A notched panel member 66 is fixed in the outlet passage 28 with a V-shaped notch 68 directed toward and receiving therein the conical segments 42, 44. The panel member 66 is fixedly mounted in a plane approximately 90° from the position shown. The panel member 66 normally would be behind the flow proportioning members 34, 36 and not be "seen" by the fluid. The panel member has been shown in a rotated condition to facilitate illustration of the relative positioning of the parts of the invention.

The present invention utilizes the relative rotation of the pair of conical conveying segments located in the interior of a device connected between a pipe (not shown) and the inlet of a flow-splitting device (usually a tee and also not shown) to proportion the mass of the non-predominant (volumetric-wise) phase flowing therethrough. The main advantages of the present invention are that the conical segments provide a gradual conveying surface without introducing a well defined blocking of the flow pattern and as a consequence maintaining a soft contour that promotes a steady flow and minimizes the possibilities of generating slugs because of stagnating points at the contour. The concavity of the conical conveying segments provides a progressively reducing storage volume limited by the arch and corresponding cord as the two-phase fluid advances along the segments. The pseudo-blocking action forces both two-phase mixture streams to change their velocities and, at the same time, conveys the liquid (or solid) phase into two different pressure gradient environments (above and below the panel member 66 as shown) caused by the difference in velocity. These adjustable different pressure gradient environments enhance the selectivity for the path of the liquid (or solid) phase particles based on the particle size and the relative vacuum to which it is exposed. The net effect of this pseudo-blocking action is a combined throttling action, with a reduced pressure drop, and selective enlargement of the wet perimeter just upstream of the flow-splitting point. The flexibility of rotating the conical segments around their center line makes them a very soft throttling device that, without introducing gross disturbances, regulates the main fluid stream velocity by enlarging or reducing the cross sectional areas of the openings leading to two isolated branches located downstream of this invention. The ability to modify the cross sectional area for regulating the velocity of the two-phase mixture stream without altering significantly the wetted surface characteristics makes this invention unique.

The present invention has been discussed as it would be used in a steam system for illustrative purposes only. The present invention could equally be applied to any two phase fluid flow system including, but not restricted to, liquid/gas and solid/gas two-phase fluids. The chemical composition of the fluid will not affect the performance of the present invention.

The drawings were briefly described using the terms horizontal and vertical for reference alone. The spacial orientation of the present invention has substantially no effect upon its operation. The drawings also are intended as illustrative only and thus many common details, such as seals to make the device fluid tight, have not been included in order not to overly complicate the drawings with non-inventive details.

The present invention may be subject to many modifications and changes without departing from the spirit or essential characteristics thereof. The present embodiment should therefor be considered in all respects as illustrative and not restrictive of the scope of the invention as defined by the appending claims.

We claim:

1. A flow proportioning device comprising:
  a housing defining a chamber having inlet and outlet passages in substantially axial alignment;
  first and second flow proportioning members mounted in said chamber, each said member having an annular flange segment and an integral conical segment extending toward said outlet passage;
  notched panel means fixed in said outlet passage lying in a plane defined by the maximum relative movement of said flow proportioning members and receiving said conical segments therein; and
  means to engage said flange segments and oppositely rotate said flow proportioning members around said outlet passage axis thereby changing the relative positioning of said conical segments whereby the ratio of the non-predominant (volumetric-wise) phase of a two-phase system can be adjusted.

2. The device according to claim 1 wherein said housing comprises:

first and second generally cylindrical housing members together defining said chamber therebetween, said first housing member defining said inlet and having means for attachment to an inlet pipe, said second housing member defining said outlet passage and having means for attachment to a flow-splitting means; and means to secure said first and second housing members together.

3. The device according to claim 1 wherein said conical segment of each said flow proportioning member subtends an angle not greater than 90°.

4. The device according to claim 1 wherein the conical segment of each said flow proportioning member extends into said outlet passage at an angle of between 5° and 25°.

5. The device according to claim 4 wherein said angle is 15°.

6. The device according to claim 1 wherein each said annular flange portion of said flow proportioning members has an annular bevel gear attached thereto with said two bevel gears being in spaced opposition, drive bevel gear means engaging said annular bevel gears in such fashion that rotation of said drive bevel gear provides oppositely directed relative rotary motion of said flow proportioning members.

7. The device according to claim 6 further comprising indicator means cooperating with said drive bevel gear means whereby the relative positioning of said flow proportioning members is indicated.

8. A method for proportioning the non-predominant (volumetric-wise) phase of a two-phase fluid flow comprising the steps of:

providing a device with a housing defining a chamber having inlet and outlet passages in substantially axial alignment, first and second flow proportioning members mounted in said chamber, each said member having an annular flange segment and an integral conical segment extending toward said outlet passage, notched panel means fixed in said outlet passage lying in a plane defined by the maximum relative movement of said flow proportioning members and receiving said conical segments therein; and means to engage said flange segments and oppositely rotate said flow proportioning members around said outlet passage axis thereby changing the relative positioning of said conical segments whereby the ratio of the non-predominant (volumetric-wise) phase can be adjusted;

relatively rotating said flow proportioning members so that the conical surface thereof pseudo blocks the cross sectional area upstream forcing both two-phase fluid streams to change their velocities conveying the dominant phase into two different pressure gradient environments caused by the difference in velocity thereby selecting the path of the non-predominant phase particles based on particle size and relative vacuum to which it is exposed.

* * * * *